United States Patent
Miyamoto

(10) Patent No.: US 9,069,270 B2
(45) Date of Patent: Jun. 30, 2015

(54) TONER FOR ELECTROSTATIC LATENT IMAGE DEVELOPMENT

(71) Applicant: KYOCERA Document Solutions Inc., Osaka-shi (JP)

(72) Inventor: Hidetoshi Miyamoto, Osaka (JP)

(73) Assignee: KYOCERA DOCUMENT SOLUTIONS INC., Osaka-Shi (JP)

( * ) Notice: Subject to any disclaimer, the term of this patent is extended or adjusted under 35 U.S.C. 154(b) by 0 days.

(21) Appl. No.: 13/852,770

(22) Filed: Mar. 28, 2013

(65) Prior Publication Data

US 2013/0260309 A1    Oct. 3, 2013

(30) Foreign Application Priority Data

Mar. 30, 2012  (JP) .................. 2012-081153
Feb. 21, 2013  (JP) .................. 2013-032573

(51) Int. Cl.
| G03G 9/087 | (2006.01) |
| G03G 9/09 | (2006.01) |
| G03G 9/08 | (2006.01) |
| C09B 67/04 | (2006.01) |
| C09B 67/00 | (2006.01) |

(52) U.S. Cl.
CPC .......... G03G 9/0819 (2013.01); G03G 9/08755 (2013.01); G03G 9/0926 (2013.01); C09B 67/0002 (2013.01); C09B 67/0022 (2013.01); C09B 67/0023 (2013.01); G03G 9/0804 (2013.01); G03G 9/0812 (2013.01); G03G 9/0918 (2013.01); G03G 9/092 (2013.01)

(58) Field of Classification Search
CPC . G03G 9/0926; G03G 9/0812; G03G 9/0804; G03G 9/08755

USPC .................. 430/108.1, 108.9, 109.4, 137.14
See application file for complete search history.

(56) References Cited

U.S. PATENT DOCUMENTS

| 7,476,481 | B2 * | 1/2009 | Fujino et al. ............... 430/110.2 |
| 8,431,303 | B2 * | 4/2013 | Sacripante et al. ........ 430/109.4 |
| 2006/0063082 | A1 * | 3/2006 | Mikuriya et al. .......... 430/108.3 |
| 2010/0028794 | A1 * | 2/2010 | Kato et al. ................. 430/108.4 |
| 2011/0177337 | A1 * | 7/2011 | Enomura ..................... 428/402 |
| 2011/0177445 | A1 * | 7/2011 | Murata et al. .............. 430/108.4 |

FOREIGN PATENT DOCUMENTS

| EP | 01950616 A1 | 7/2008 |
| EP | 01972662 A2 | 9/2008 |
| EP | 02040126 A1 | 3/2009 |
| EP | 02184109 A1 | 5/2010 |
| JP | 2010-049195 A | 3/2010 |

OTHER PUBLICATIONS

EESR issued to EP Application No. 13161392.9, mailed Jul. 15, 2013.

* cited by examiner

*Primary Examiner* — Janis L Dote
(74) *Attorney, Agent, or Firm* — Knobbe Martens Olson & Bear LLP

(57) ABSTRACT

A toner containing a binder resin, a release agent, and pigment fine particles is produced by aggregating fine particles containing the components of the toner to obtain fine particle aggregates and then coalescing the fine particle aggregates. The pigment fine particles have an average primary particle diameter of 50 nm or less, a Cv value of less than 20%, and an average circularity of 0.900 or more.

5 Claims, 2 Drawing Sheets

TONER FOR ELECTROSTATIC LATENT IMAGE DEVELOPMENT

INCORPORATION BY REFERENCE

This application is based upon and claims the benefit of priority from the corresponding Japanese Patent Application Nos. 2012-081153 and 2013-032573, respectively filed in the Japan Patent Office on Mar. 30, 2012 and Feb. 21, 2013, the entire contents of which are incorporated herein by reference.

The present disclosure relates to a toner for electrostatic latent image development.

BACKGROUND

In electrophotography, generally, a surface of a latent image bearing member is charged using corona discharge etc. followed by exposure using laser etc. to form an electrostatic latent image, which is then developed to form a toner image, and the formed toner image is further transferred on a recording medium to obtain an image with high quality. The toner used for the electrophotography is typically one produced by mixing a binder resin such as thermoplastic resin with a colorant, a charge control agent, a release agent, a magnetic material, and the like, then the mixture is further mixed and kneaded, pulverized, and classified to form toner particles with an average particle diameter of from 5 μm to 10 μm. In order to provide flowability to the toner, to perform charge control of the toner, and/or to improve cleaning ability of the toner, silica and/or inorganic fine particles such as those of titanium oxide are externally added to the toner.

In recent years, such a toner is required to have a smaller particle diameter so as to improve resolution from the viewpoint of higher image quality of formed images. It is effective for producing images with high quality that average particle diameter of the toner is reduced to about 5 μm and also particle size distribution of the toner is made sharp.

For this reason, a method of aggregating fine particles has been attracting attention, in which fine particles of components such as a binder resin, a colorant, and a release agent in the toner are aggregated and then the formed aggregates are heated and coalesced to produce the toner, since shape of the toner and dispersibility of components such as a colorant and a release agent in the toner may be easily controlled in addition to particle size distribution of toner particles. In relation to the method of aggregating fine particles, a toner production method has been proposed, in which a mixture of a binder resin, a colorant, a release agent, and an aqueous medium is added with a dispersant such as methylcellulose and hydroxyethylcellulose to prepare a dispersion, and the components in the dispersion are aggregated, and then the formed aggregates of fine particles are coalesced to obtain a toner.

It has been confirmed that a toner with a small particle diameter can be obtained by the above-mentioned method using a certain dispersant. However, in this method, aggregation of pigment fine particles themselves tends to occur when using a pigment as a colorant in the step of aggregating fine particles of the components such as a binder resin, a colorant, and a release agent. Therefore, this method tends to cause compositional variation in the aggregates consisting of fine particles of the binder resin, fine particles of the colorant, and fine particles of the release agent. The occurrence of the compositional variation may possibly lead to a broad distribution of charge amount of the obtained toner. In such a case, image density of formed images may become lower than a desired value when printing for a long time.

In order to solve the problem of aggregation of pigment fine particles, a method may be envisaged in which a large amount of an auxiliary dispersant is added to enhance dispersibility of the pigment fine particles when preparing the pigment fine particles. However, in this case, aggregation of the fine particles may be partially disturbed in the step of aggregating the fine particles of components such as a binder resin, a colorant, and a release agent, and thus the particle size distribution of the obtained toner may become broad. In this case, charge amount distribution of the toner is also broad since surface areas of toner particles are different depending on their particle diameters.

SUMMARY

The toner for electrostatic latent image development of the present disclosure includes at least a binder resin, pigment fine particles, and a release agent. The toner for electrostatic latent image development of the present disclosure can be prepared by aggregating fine particles containing the components of the toner for electrostatic latent image development to thereby obtain fine particle aggregates and then coalescing the fine particle aggregates. The pigment fine particles in the toner for electrostatic latent image development of the present disclosure have an average primary particle diameter of 50 nm or less, a Cv value of less than 20%, and an average circularity of 0.900 or more.

DETAILED DESCRIPTION

Figure 1:
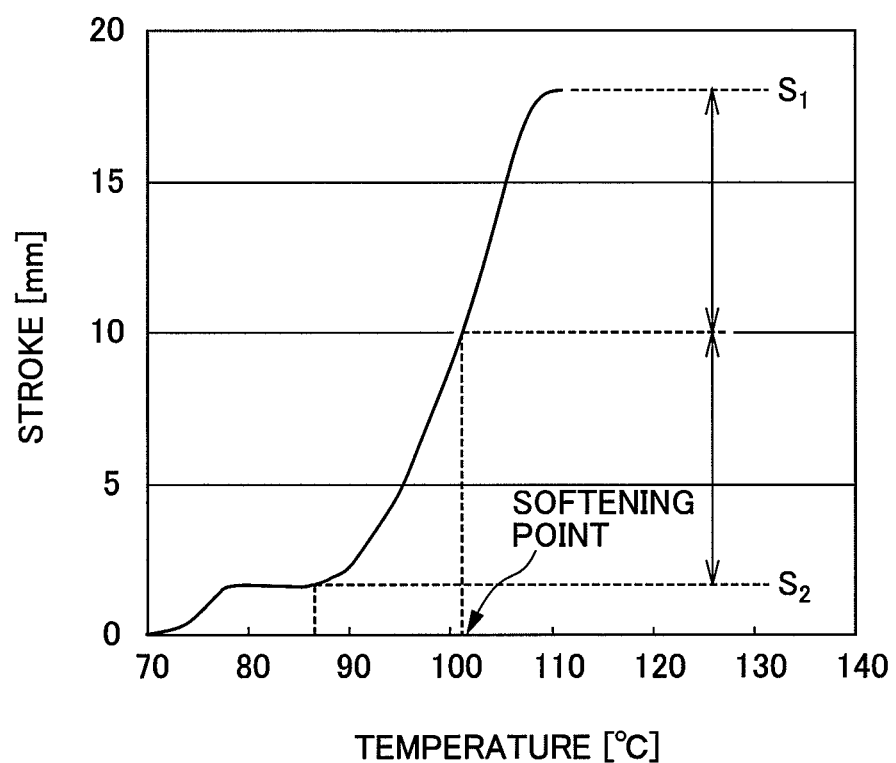
FIG. 1 is a view that illustrates a method of measuring a softening point using an elevated flow tester.

The present disclosure is explained in detail with respect to embodiments thereof below; however, the present disclosure is not limited at all to the embodiments and may be carried out with appropriately making a change within the purpose of the present disclosure. In addition, explanation may be occasionally omitted with respect to duplicated matters; this does not however limit the gist of the present disclosure.

The toner for electrostatic latent image development of the present disclosure includes a binder resin, a release agent, and pigment fine particles that have an average primary particle diameter of 50 nm or less, a Cv value of less than 20%, and an average circularity of 0.900 or more. The toner for electrostatic latent image development of the present disclosure can be prepared by aggregating fine particles containing the components of the toner for electrostatic latent image development to thereby obtain fine particle aggregates and then coalescing the fine particle aggregates. The toner for electrostatic latent image development of the present disclosure and a method of producing the toner for electrostatic latent image development of the present disclosure are explained in order below.

<<Toner for Electrostatic Latent Image Development>>

The toner for electrostatic latent image development of the present disclosure (hereinafter, also simply referred to as "toner") essentially contains a binder resin, a pigment, and a release agent, and also optionally contains components such as a charge control agent and a magnetic powder as required. The toner of the present disclosure may be added with an external additive on its surface, as required. The toner of the present disclosure may be mixed with a desired carrier and used as a two-component developer. The binder resin, the pigment, the release agent, the charge control agent, the magnetic powder, and the external additive used for producing the toner as essential or optional components, and also the carrier employed when the toner is used as the two-component developer are explained in order.

[Binder Resin]

The binder resin may be appropriately selected from conventional resins used heretofore for binder resins of toners. Specific examples of the binder resin may be exemplified by thermoplastic resins such as styrene resins, (meth)acrylic resins, styrene-(meth)acrylic resins, polyethylene resins, polypropylene resins, vinyl chloride resins, polyester resins, polyamide resins, polyurethane resins, polyvinyl alcohol resins, vinyl ether resins, N-vinyl resins, and styrene-butadiene resins.

Preferably, the binder resin has an acidic group such as carboxylic group or sulfonic acid group at a part of molecular chain (end or side chain) since aggregation of fine particles properly progresses in a step (I) when producing the toner by an appropriate production method described later. The resin having such an acidic group may be exemplified by (meth) acrylic resins, styrene-(meth)acrylic resins, and polyester resins. Among these resins having an acidic group, polyester resins are preferable from the viewpoints that a melting point or a glass transition point thereof may be easily adjusted, a toner with excellent low-temperature fixability may be easily prepared, and colorants may be easily dispersed in the toner.

When the binder resin is one having an acidic group, the acidic value of the binder resin is preferably from 5 to 40 mg KOH/g. When preparing the toner using a binder resin having an excessively low acidic value, it may be difficult to properly progress aggregation of fine particles depending on a formulation in the step (I) described later. When preparing the toner using a binder resin having an excessively high acidic value, various properties of the obtained toner may be impaired by moisture under high humidity conditions.

In regards to the resin having an acidic group, the (meth) acrylic resin, the styrene-(meth)acrylic resin, and the polyester resin are explained in order below.

[(Meth)Acrylic Resin]

The (meth)acrylic resin may be obtained by copolymerizing a monomer containing at least a (meth)acrylic monomer. The content of the unit derived from the (meth)acrylic monomer in the (meth)acrylic resin is preferably at least 70% by mass, more preferably at least 80% by mass, particularly preferably at least 90% by mass, and most preferably 100% by mass.

The (meth)acrylic monomer used for preparing the (meth) acrylic resin may be exemplified by (meth)acrylic acid; alkyl (meth)acrylates such as methyl(meth)acrylate, ethyl(meth) acrylate, and propyl(meth)acrylate; and (meth)acrylic amide compounds such as (meth)acrylic amide, N-alkyl (meth) acrylic amide, N-aryl (meth)acrylic amide, N,N-dialkyl (meth)acrylic amide, and N,N-diaryl (meth)acrylic amide. Preferably, the (meth)acrylic resin includes a carboxylic group in a unit derived from (meth)acrylic acid as the acidic group. In this case, the acid value of the (meth)acrylic resin can be adjusted by increasing or decreasing the amount of (meth)acrylic acid used when preparing the (meth)acrylic resin.

In cases where the (meth)acrylic resin is prepared by copolymerizing another monomer other than (meth)acrylic monomers, another monomer may be exemplified by olefins such as ethylene, propylene, butene-1, pentene-1, hexene-1, heptene-1, and octene-1; allyl esters such as allyl acetate, allyl benzoate, allyl acetoacetate, and allyl lactate; vinyl ethers such as hexyl vinyl ether, octyl vinyl ether, ethylhexyl vinyl ether, methoxyethyl vinyl ether, ethoxyethyl vinyl ether, chloroethyl vinyl ether, 2-ethylbutyl vinyl ether, dimethylamino ethyl vinyl ether, diethylamino ethyl vinyl ether, benzyl vinyl ether, vinylphenyl ether, vinyl tolyl ether, vinyl chlorophenyl ether, vinyl-2,4-dichlorophenyl ether, and vinyl naphthyl ether; and vinyl esters such as vinyl acetate, vinyl propionate, vinyl butyrate, vinyl isobutyrate, vinyl diethyl acetate, vinyl chloro acetate, vinyl methoxy acetate, vinyl butoxy acetate, vinyl phenyl acetate, vinyl acetoacetate, vinyl lactate, vinyl benzoate, vinyl salicylate, vinyl chlorobenzoate, and vinyl naphthoate.

[Styrene-(Meth)Acrylic Resin]

The styrene-(meth)acrylic resin may be obtained by copolymerizing a monomer containing at least a styrene monomer and a (meth)acrylic monomer. The total content of the unit derived from the styrene monomer and the unit derived from the (meth)acrylic monomer in the styrene-(meth)acrylic resin is preferably at least 70% by mass, more preferably at least 80% by mass, particularly preferably at least 90% by mass, and most preferably 100% by mass.

The styrene monomer used for preparing the styrene-(meth)acrylic resin may be exemplified by styrene, α-methylstyrene, o-methylstyrene, m-methylstyrene, p-methylstyrene, p-ethylstyrene, 2,4-dimethylstyrene, p-n-butylstyrene, p-dodecylstyrene, p-methoxystyrene, p-phenylstyrene, and p-chlorostyrene.

The (meth)acrylic monomers used for preparing the styrene-(meth)acrylic resin are similar to the (meth)acrylic monomers used for preparing the (meth)acrylic resin.

Preferably, the styrene-(meth)acrylic resin includes a carboxylic group of a unit derived from (meth)acrylic acid as the acidic group. In this case, the acid value of the styrene-(meth) acrylic resin can be adjusted by increasing or decreasing the amount of (meth)acrylic acid used when preparing the styrene-(meth)acrylic resin.

In cases where the styrene-(meth)acrylic resin is prepared by copolymerizing another monomer other than styrene monomers and (meth)acrylic monomers, examples of the another monomer are similar to those of another monomers other than (meth)acrylic monomers in the (meth)acrylic resin.

[Polyester Resin]

The polyester resin may be those obtained from condensation polymerization or condensation copolymerization of a divalent, trivalent or higher-valent alcohol component and a divalent, trivalent or higher-valent carboxylic acid component. The components used for synthesizing the polyester resin may be exemplified by alcohol components and carboxylic acid components below.

Specific examples of the divalent, trivalent or higher-valent alcohols may be exemplified by diols such as ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexane dimethanol, dipropylene glycol, polyethylene glycol, polypropylene glycol, and polytetramethylene glycol; bisphenols such as bisphenol A, hydrogenated bisphenol A, polyoxyethylenated bisphenol A, and polyoxypropylenated bisphenol A; and trivalent or higher-valent alcohols such as sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Specific examples of the divalent, trivalent or higher-valent carboxylic acids include divalent carboxylic acids such as maleic acid, fumaric acid, citraconic acid, itaconic acid, glutaconic acid, phthalic acid, isophthalic acid, terephthalic acid, cyclohexane dicarboxylic acid, succinic acid, adipic acid, sebacic acid, azelaic acid, 1,10-decanedicarboxylic acid, malonic acid, or alkyl or alkenyl succinic acids including n-butyl succinic acid, n-butenyl succinic acid, isobutylsuccinic acid, isobutenylsuccinic acid, n-octylsuccinic acid, n-octenylsuccinic acid, n-dodecylsuccinic acid, n-dodecenylsuccinic acid, isododecylsuccinic acid, isododecenylsuccinic acid; and trivalent or higher-valent carboxylic acids such as 1,2,4-benzene tricarboxylic acid (trimellitic acid), 1,2,5-benzene tricarboxylic acid, 2,5,7-naphthalene tricarboxylic acid, 1,2,4-naphthalene tricarboxylic acid, 1,2,4-butane tricarboxylic acid, 1,2,5-hexane tricarboxylic acid, 1,3-dicarboxyl-2-methyl-2-methylene carboxypropane, 1,2,4-cyclohexane tricarboxylic acid, tetra(methylenecarboxyl)methane, 1,2,7,8-octanetetracarboxylic acid, pyromellitic acid, and Enpol trimer. These divalent, trivalent or higher-valent carboxylic acids may be used as ester-forming derivatives such as an acid halide, an acid anhydride, and a lower alkyl ester. Here, the term "lower alkyl" means an alkyl group of from 1 to 6 carbon atoms.

The acid value of the polyester resin can be controlled by adjusting the balance between the functional groups of the hydroxyl group of alcohol components and the carboxyl group of carboxylic acid components which are used for synthesizing the polyester resin.

A thermoplastic resin is preferably used for the binder resin since fixability to paper of the toner is good; the thermoplastic resin may be added with a cross-linking agent or a thermosetting resin rather than solely using the thermoplastic resin. By introducing a partial cross-linked structure into the binder resin, properties of the toner such as storage stability, morphological retention, and durability may be improved without degrading fixability of the toner.

Preferable examples of the thermosetting resin usable in combination with the thermoplastic resin are epoxy resins and cyanate resins. Specific examples of the preferred thermosetting resin may be exemplified by bisphenol-A type epoxy resins, hydrogenated bisphenol-A type epoxy resins, novolac-type epoxy resins, polyalkylene ether-type epoxy resins, cyclic aliphatic-type epoxy resins, and cyanate resins. These thermosetting resins may be used in a combination of two or more.

Softening point of the binder resin is preferably from 80° C. to 150° C. and more preferably from 90° C. to 140° C. In cases of using a toner containing the binder resin with an excessively high softening point, it may be difficult to properly fix the toner at lower temperatures. In cases of using a toner containing the binder resin with an excessively low softening point, heat-resistant storage stability of the toner may degrade such that the toner agglomerates during storage at higher temperatures. The softening point of the binder resin can be measured in accordance with the method below.

<Method of Measuring Softening Point>

The softening point of the binder resin (toner) is measured using an elevated flow tester (CFT-500D, by Shimadzu Co.). A toner sample of 1.5 g is measured using a die of 1.00 mm height and 1.00 mm diameter under a condition of temperature-increase rate 4° C./rain, pre-heat time 300 seconds, load 5 kg, and measuring temperature range from 60° C. to 200° C. The softening point can be read from an S-shaped curve that is obtained from the measurement using the flow tester and that shows a relation between temperature (° C.) and stroke (mm).

The way to read the softening point is explained with reference to FIG. 1. A maximum stroke value is defined as S1, and a base line stroke value on the lower temperature side is defined as S2. The temperature at which the stroke value is (S1+S2)/2 in the S-shaped curve is defined as the softening point of the sample to be measured.

Preferably, glass transition point (Tg) of the binder resin is from 50° C. to 70° C. In cases of using a toner containing the binder resin with an excessively low Tg, toner particles may agglomerate under an environment of high temperature and high humidity due to a lower strength of entire toner particles. In cases of using a toner containing the binder resin with an excessively high Tg, it may be difficult to properly fix the toner at lower temperatures.

<Method of Measuring Glass Transition Point (Tg)>

Glass transition point of the binder resin can be determined by a measuring method on the basis of JIS K7121. More specifically, it can be determined by measuring an endothermic curve of the binder resin using a differential scanning calorimeter (DSC-6200, by Seiko Instruments Inc.) as a measuring device. 10 mg of a sample to be measured is loaded into an aluminum pan and an empty aluminum pan is used as a reference, an endothermic curve is obtained under a condition of measuring temperature range from 25° C. to 200° C., temperature-increase rate 10° C./min, and normal temperature and normal humidity, then the glass transition point can be determined from the obtained endothermic curve of the binder resin.

Number average molecular mass (Mn) of the binder resin is preferably from 3,000 to 20,000 and more preferably from 5,000 to 15,000. Molecular mass distribution (Mw/Mn) expressed by a ratio of mass average molecular mass (Mw) to number average molecular mass (Mn) is preferably from 2 to 60 and more preferably from 2 to 10. When the molecular mass distribution of the binder resin is within this range, occurrence of offset may be easily suppressed and the obtained toner may be easily imparted with a broad temperature range free from occurrence of offset. The number average molecular mass (Mn) and the mass average molecular mass (Mw) of the binder resin can be measured using gel permeation chromatography.

[Pigment]

The pigment in the toner for electrostatic latent image development may be selected from conventional ones depending on the color of toner particles. Specific examples of a preferable pigment added to the toner may be exemplified by those below.

Yellow colorants may be exemplified by those of condensed azo compounds, isoindolinone compounds, anthraquinone compounds, azo metal complexes, methine compounds, and allylamide compounds. Specifically, C.I. pigment yellows 3, 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, and 194; Naphthol Yellow S, Hansa Yellow G, and C.I. Vat Yellow may be exemplified.

Magenta colorants may be exemplified by those of condensed azo compounds, diketo-pyrrolo-pyrrole compounds, anthraquinone compounds, quinacridone compounds, basic dye lake compounds, naphthol compounds, benzimidazolone compounds, thioindigo compounds, and perylene compounds. Specifically, C.I. pigment reds 2, 3, 5, 6, 7, 19, 23, 48:2, 48:3, 48:4, 57:1, 81:1, 122, 144, 146, 150, 166, 169, 177, 184, 185, 202, 206, 220, 221, and 254 may be exemplified.

Cyan colorants may be exemplified by those of copper phthalocyanine compounds, copper phthalocyanine derivatives, anthraquinone compounds, and basic dye lake compounds. Specifically, C.I. pigment blues 1, 7, 15, 15:1, 15:2, 15:3, 15:4, 60, 62, and 66, Phthalocyanine Blue, C.I. Vat Blue, and C.I. Acid Blue may be exemplified.

The amount of the colorant used is preferably from 1 to 30 parts by mass based on 100 parts by mass of the binder resin.

[Release Agent]

The toner for electrostatic latent image development includes the release agent for the purpose of improving fixability and offset resistance. The type of the release agent may be those of conventional release agents used for toners heretofore without particularly limitation.

Preferable release agents may be exemplified by aliphatic hydrocarbon waxes such as low molecular mass polyethylene, low molecular mass polypropylene, polyolefin copolymer, polyolefin wax, microcrystalline wax, paraffin wax, and Fischer-Tropsch wax; oxides of aliphatic hydrocarbon wax such as oxidized polyethylene wax and block copolymer of oxidized polyethylene wax; vegetable waxes such as candelilla wax, carnauba wax, Japan wax, jojoba wax, and rice wax; animal waxes such as bees wax, lanolin, and whale wax; mineral waxes such as ozokerite, ceresin, and petrolatum; waxes containing a fatty acid ester as a main component such as montanate ester wax and castor wax; and waxes obtained by deoxidization of a part or whole of fatty acid ester such as deoxidized carnauba wax.

The amount of the release agent used is preferably from 1 to 20 parts by mass and more preferably from 5 to 15 parts by mass based on 100 parts by mass of the binder resin.

[Charge Control Agent]

The toner for electrostatic latent-image development may contain a charge control agent as required. The charge control agent is used for the purpose of improving a charge level stability of the toner or a charge-increasing property, which gives an indication of chargeability to a predetermined charge level within a short time, to thereby obtain a toner with excellent durability and stability. When developing by positively charging the toner, a positively chargeable charge control agent is used; and when developing by negatively charging the toner, a negatively chargeable charge control agent is used.

The charge control agent may be appropriately selected from those used for toners heretofore. Specific examples of the positively chargeable charge control agent may be exemplified by azine compounds such as pyridazine, pyrimidine, pyrazine, ortho-oxazine, meta-oxazine, para-oxazine, ortho-thazine, meta-thiazine, para-thiazine, 1,2,3-triazine, 1,2,4-triazine, 1,3,5-triazine, 1,2,4-oxadiazine, 1,3,4-oxadiazine, 1,2,6-oxadiazine, 1,3,4-thiadiazine, 1,3,5-thiadiazine, 1,2,3,4-tetrazine, 1,2,4,5-tetrazine, 1,2,3,5-tetrazine, 1,2,4,6-oxatriazine, 1,3,4,5-oxatriazine, phthalazine, quinazoline, and quinoxaline; direct dyes consisting of azine compounds such as azine Fastred FC, azine Fastred 12BK, azine Violet BO, azine Brown 3G, azine Light Brown GR, azine Dark Green BH/C, azine Deep Black EW, and azine Deep Black 3RL; nigrosine compounds such as nigrosine, nigrosine salts, and nigrosine derivatives; acid dyes consisting of nigrosine compounds such as nigrosine BK, nigrosine NB, and nigrosine Z; metal salts of naphthenic acid or higher fatty acid; alkoxylated amines; alkylamides; quaternary ammonium salts such as benzylmethylhexyldecyl ammonium and decyltrimethylammonium chloride; and the like. Among these positively chargeable charge control agents, nigrosine compounds are particularly preferable since more rapid charge-increasing property may be obtained. These positively chargeable charge control agents may be used in a combination of two or more.

In addition, resins having a quaternary ammonium salt, a carboxylic acid salt, or a carboxyl group as a functional group may be used as the positively chargeable charge control agent. More specifically, styrene resins having a quaternary ammonium salt, acrylic resins having a quaternary ammonium salt, styrene-acrylic resins having a quaternary ammonium salt, polyester resins having a quaternary ammonium salt, styrene resins having a carboxylic acid salt, acrylic resins having a carboxylic acid salt, styrene-acrylic resins having a carboxylic acid salt, polyester resins having a carboxylic acid salt, styrene resins having a carboxylic group, acrylic resins having a carboxylic group, styrene-acrylic resins having a carboxylic group, and polyester resins having a carboxylic group, may be exemplified. The molecular mass of these resins is not particularly limited within a range not inhibiting the purpose of the present disclosure; and oligomers or polymers may also be allowable.

Specific examples of the negatively chargeable charge control agent may be exemplified by organic metal complexes and chelate compounds. The organic metal complex and the chelate compound are preferably acetylacetone metal complexes such as aluminum acetylacetonate and iron (II) acetylacetonate and salicylic acid metal complexes or salicylic acid metal salts such as 3,5-di-tert-butylsalicylic acid chromium and more preferably salicylic acid metal complexes or salicylic acid metal salts. These negatively chargeable charge control agents may be used in a combination of two or more.

The amount of the positively or negatively chargeable charge control agent used is preferably from 1.5 to 15 parts by mass based on 100 parts by mass of the total amount of the toner, more preferably from 2.0 to 8.0 parts by mass, and particularly preferably from 3.0 to 7.0 parts by mass. In cases of using a toner where the content of the charge control agent is excessively small, image density of formed images may be lower than an intended value or image density is unlikely to be maintained for a long period since the toner is resistant to be stably charged to a predetermined polarity. In this case also, fogging tends to appear in formed images or smear tends to occur at latent image bearing members since the charge control agent is resistant to be uniformly dispersed into the binder resin. In cases of using a toner where the content of the charge control agent is excessively large, problems such as smear at latent image bearing members and image defects in formed images due to inferior charge under high temperature and high humidity are likely to occur since environment resistance degrades.

[Magnetic Powder]

The toner for electrostatic latent image development may be compounded with a magnetic powder, as required. Preferable examples of the magnetic powder may be exemplified by iron oxides such as ferrite and magnetite, ferromagnetic metals such as those of cobalt and nickel, alloys of iron and/or ferromagnetic metals, compounds of iron and/or ferromagnetic metals, ferromagnetic alloys via ferromagnetizing treatment like heat-treatment, and chromium dioxide.

Particle diameter of the magnetic powder is preferably from 0.1 μm to 1.0 μm and more preferably from 0.1 μm to 0.5 μm. A magnetic powder within this range of particle diameter may be easily dispersed into the binder resin.

In order to improve dispersibility of the magnetic powder into the binder resin, surfaces treated by a surface treatment agent such as a titanium coupling agent and a silane coupling agent may also be used.

In cases of using the toner as a one-component developer, the amount of the magnetic powder used is preferably from 35 to 60 parts by mass and more preferably from 40 to 60 parts by mass based on 100 parts by mass of the total amount of the toner. In cases of using a toner where the content of the magnetic powder is excessively large, image density is unlikely to be maintained for a long period or it may be remarkably difficult to fix toner images. In cases of using a toner where the content of the magnetic powder is excessively small, fogging tends to appear in formed images or image density is unlikely to be maintained for a long period. In cases of using the toner as a two-component developer, the amount of the magnetic powder used is preferably 20 parts by mass or less and more preferably 15 parts by mass or less based on 100 parts by mass of the total amount of the toner.

[External Additive]

The toner for electrostatic latent image development obtained from the method of the present disclosure may be surface-treated with the external additive as required. The type of the external additive is not particularly limited within a range not inhibiting the purpose of the present disclosure, and it can be appropriately selected from conventional external additives used for toners heretofore. Specific examples of the preferable external additive may be exemplified by silica and metal oxides such as alumina, titanium oxide, magnesium oxide, zinc oxide, strontium titanate, and barium titanate. These external additives may be used in a combination of two or more.

Particle diameter of the external additive is preferably from 0.01 µm to 1.0 µm.

The amount of the external additive used is preferably from 0.1 to 10 parts by mass and more preferably from 0.2 to 5 parts by mass based on 100 parts by mass of toner particles before the external treatment.

[Carrier]

The toner for electrostatic latent image development obtained from the method of the present disclosure may be mixed with a desired carrier and used as a two-component developer. In cases of preparing the two-component developer, a magnetic carrier is preferably used.

A carrier, whose carrier core material is coated with a resin, may be exemplified as a preferable carrier in cases of using the toner for electrostatic latent image development as the two-component developer. Specific examples of the carrier core material may be exemplified by metal particles of iron, oxidized iron, reduced iron, magnetite, copper, silicon steel, ferrite, nickel, or cobalt; alloy particles of these materials and metals such as manganese, zinc, and aluminum; alloy particles such as iron-nickel alloy or iron-cobalt alloy; ceramic particles of titanium oxide, aluminum oxide, copper oxide, magnesium oxide, lead oxide, zirconium oxide, silicon carbide, magnesium titanate, barium titanate, lithium titanate, lead titanate, lead zirconate, or lithium niobate; particles of higher permittivity materials such as ammonium dihydrogen phosphate, potassium dihydrogen phosphate, and Rochelle salts; resin carriers containing these magnetic particles dispersed in resins; and the like.

Specific examples of the resin, which coats the carrier core material, may be exemplified by (meth)acrylic polymers, styrene polymers, styrene-(meth)acrylic copolymers, olefin polymers (polyethylene, chlorinated polyethylene, and polypropylene), polyvinyl chloride, polyvinyl acetate, polycarbonate, cellulose resins, polyester resins, unsaturated polyester resins, polyamide resins, polyurethane resins, epoxy resins, silicone resins, fluorine resins (polytetrafluoroethylene, polychlorotrifluoroethylene, and polyvinylidene fluoride), phenol resins, xylene resins, diallyl phthalate resins, polyacetal resins, and amino resins. These resins may be used in a combination of two or more.

Particle diameter of the carrier is preferably from 20 µm to 120 µm and more preferably from 25 µm to 80 µm as a particle diameter measured by an electron microscope.

When the toner for electrostatic latent image development of the present disclosure is used as the two-component developer, the content of the toner is preferably from 3% to 20% by mass and more preferably from 5% to 15% by mass based on the mass of the two-component developer. By adjusting the content of the toner in the two-component developer within this range, images with an appropriate image density may be continuously formed, and pollution inside image forming apparatuses or adhesion of the toner to recorded media such as transfer paper may be suppressed because of inhibiting scattering of the toner from development units.

Using the materials described above, the toner for electrostatic latent image development can be prepared by the method explained below.

<<Method of Producing Toner for Electrostatic Latent Image Development>>

The toner for electrostatic latent image development of the present disclosure can be prepared by aggregating fine particles containing the components of the toner for electrostatic latent image development to thereby obtain fine particle aggregates and then coalescing the fine particle aggregates. Preferably, the toner for electrostatic latent image development of the present disclosure is produced by a method including at least the steps (I) and (II) below:

(I) an aggregation step of mixing (A) and (B) below to obtain an aqueous-medium dispersion of fine particles and then aggregating the fine particles to obtain an aqueous-medium dispersion of fine particle aggregates that contains a binder resin, a colorant, and a release agent; and (A) a dispersion of a binder resin containing at least binder resin fine particles with a volume average particle diameter of 1.0 µm or less and a dispersion of a release agent containing at least release agent fine particles with a volume average particle diameter of 1.0 µm or less; or a dispersion of a binder resin composition containing fine particles, with a volume average particle diameter of 1.0 µm or less, that contains at least a binder resin and a release agent; and (B) a dispersion of a pigment containing pigment fine particles;

(II) a shape control step of heat-treating the aqueous-medium dispersion of the fine particle aggregates.

A dispersion of a pigment containing pigment fine particles, which have an average primary particle diameter of 50 nm or less, a Cv value of less than 20%, and an average circularity of 0.900 or more, is used in the method of producing the toner for electrostatic latent image development of the present disclosure. The method to prepare the dispersion of the pigment fine particles, containing the pigment fine particles having the average primary particle diameter, the Cv value, and the average circularity within the above ranges, is not particularly limited; preferably, the production method using a microreactor described below is employed.

Specifically, a method of producing the dispersion of the pigment fine particle is preferably employed, in which the dispersion of the pigment fine particle is prepared by mixing a first pigment raw liquid and a second pigment raw liquid to thereby deposit a pigment, by use of a microreactor. The microreactor is equipped with two circular disks of a fixed disk A and a rotatable disk B placed such that a thin layer is formed between circular surfaces of the two disks; a first raw liquid supply portion that supplies the first pigment raw liquid from a thin layer end to the thin layer; and at least one second raw liquid supply portion that is formed through an upper surface and a lower surface of the fixed disk, that is positioned opposite to the first raw liquid supply with respect to the center of the circular surface of the fixed disk, and that supplies the second pigment raw liquid from the upper side of the fixed disk.

The toner for electrostatic latent image development of the present disclosure is produced using the dispersion of the pigment fine particle that contains the pigment fine particles having an average primary particle diameter of 50 nm or less, a Cv value of less than 20%, and an average circularity of 0.900 or more, therefore, the shape is uniform, and particle diameter distribution and charge amount distribution thereof are sharp.

The method of producing the toner for electrostatic latent image development including the steps (I) and (II) may further include the steps (III) to (V) below, as required: (III) a cleaning step of cleaning the shape-controlled toner; (IV) a drying step of drying the shape-controlled toner; and (V) an external addition step of attaching an external additive to a surface of the shape-controlled toner.

Hereinafter, the steps (I) to (V) are explained in order.

[(I) Aggregation Step]

(I) In the aggregation step, initially,
a dispersion of a binder resin containing at least binder resin fine particles with a volume average particle diameter of 1.0 μm or less and a dispersion of a release agent containing at least release agent fine particles with a volume average particle diameter of 1.0 μm or less; or
a dispersion of a binder resin composition containing fine particles, with a volume average particle diameter of 1.0 μm or less, that contain at least a binder resin and a release agent; and a dispersion of a pigment containing pigment fine particles with an average primary particle diameter, a Cv value, and an average circularity each within a predetermined range are mixed, then fine particles in the mixed liquid are aggregated. The method to aggregate the fine particles in an aqueous medium is not particularly limited. Hereinafter, preparation of fine particles and aggregation of fine particles are explained in order.

[Preparation of Fine Particles]

The method of preparing the dispersion, used in the step (I), other than the dispersion of the pigment is not particularly limited. Typically, the dispersion of fine particles containing these components is prepared as an aqueous-medium dispersion where a composition is made into fine particles of a desired size in an aqueous medium. Hereinafter, the method of preparing a dispersion of fine particles is explained with respect to every component in fine particles.

(Preparation of Dispersion of Binder Resin Composition Including Fine Particles Containing Binder Resin and Release Agent)

Hereinafter, the method of preparing the dispersion of the binder resin composition including fine particles that contain a binder resin and a release agent is explained.

Initially, components such as a binder resin and a release agent and optionally a charge control agent and a magnetic powder are mixed using a mixing device such as a HENSCHEL MIXER (by Mitsui Mining Co.). Then, the obtained mixture is melted and kneaded using a kneading device such as a twin screw extruder, a three-roll kneader, or a two-roll kneader to obtain a binder resin composition. After cooling the obtained binder resin composition, the binder resin composition is coarsely pulverized by a pulverizing device such as a cutter mill, a feather mill, and a jet mill. Preferably, particle diameter of the binder resin composition after the coarse pulverizing is 30 μm or less.

The coarsely pulverized product of the binder resin composition is dispersed into an aqueous medium to obtain a dispersion of the binder resin composition. By heating the dispersion to a temperature of no less than 10° C. higher than the softening point of the binder resin measured by the flow tester and applying a strong shear force to the hot dispersion of the binder resin composition using a homogenizer or a pressure-discharge type disperser, an aqueous-medium dispersion of fine particles with a volume average particle diameter of 1.0 μm or less containing the binder and the release agent can be obtained.

The device to apply a strong shear force to the dispersion may be exemplified by NANO3000 (by Beryu Co.), NANOMIZER (by Yoshida Kikai Co.), MICROFLUIDIZER (by MFI Co.), GAULIN HOMOGENIZER Gaulin homogenizer (by Manton-Gaulin Co.), and CLEARMIX W-MOTION (by M. Technique Co.).

When the volume average particle diameter (D50) of fine particles containing the binder resin and the release agent obtained from the method described above is 1.0 μm or less, the toner for electrostatic latent image development having a uniform shape and a sharp particle size distribution may be easily prepared. Thereby, performance and productivity of the toner can be stabilized. More preferably, the volume average particle diameter (D50) of fine particles containing the binder resin and the release agent is from 0.1 μm to 0.5 μm. By adjusting the volume average particle diameter (D50) of fine particles containing the binder resin and the release agent within this range, the above-mentioned effect may be further promoted.

The aqueous medium is not particularly limited within a range not inhibiting the purpose of the present disclosure as long as it is a liquid medium composed mostly of water. The water in the aqueous medium may be appropriately selected from water such as clean water, industrial water, distilled water, and ion-exchanged water.

The aqueous medium may contain an organic solvent within a range not inhibiting the purpose of the present disclosure. When the aqueous medium contains an organic solvent, the content of the organic solvent is preferably 20% by mass or less based on the mass of the aqueous medium, more preferably 10% by mass or less, and most preferably 5% by mass or less. The organic solvent, which may be included in the aqueous medium, may be exemplified by alcohols such as ethanol and methanol, ethers such as tetrahydrofuran, ketones such as acetone, and nitrogen-containing polar organic solvents such as N,N-dimethylformamide, N,N-dimethylacetamide, and N-methyl-2-pyrrolidone.

The amount of the aqueous medium used to the binder resin composition is not particularly limited as long as microparticulation of the binder resin composition properly progresses. The amount of the aqueous medium used to the binder resin composition depends on a type of the device used for preparing the fine particles; typically, the amount is preferably from 1 to 5 times by mass and more preferably from 2 to 4 times by mass based on the mass of the binder resin composition.

Preferably, the aqueous medium includes a surfactant. When the aqueous medium includes a surfactant, microparticulation of the binder resin composition may properly progress and thus the dispersion of fine particles with excellent dispersion stability may be easily obtained.

The surfactant used for preparing the fine particles in the aqueous medium is not particularly limited and may be appropriately selected from the group consisting of anionic surfactants, cationic surfactants, and nonionic surfactants. Examples of the anionic surfactant may be exemplified by sulfuric acid ester salt type surfactants, sulfonic acid salt type surfactants, and soaps. Examples of the cationic surfactant may be exemplified by amine salt type surfactants and quaternary ammonium salt type surfactants. Examples of the nonionic surfactant may be exemplified by polyethylene glycol type surfactants, alkylphenol ethylene oxide adduct type surfactants, and polyvalent alcohol type surfactants which are derivatives of polyvalent alcohols such as glycerin, sorbitol and sorbitan. Among these surfactants, it is preferred to use at least one of the anionic surfactants and the nonionic surfactants. These surfactants may be used alone or in a combination of two or more.

Polyoxyethylene alkylether sulfates are preferable as the anionic surfactant. Among the polyoxyethylene alkylether sulfates, those expressed by Formula (1) below are preferable.

$$R^1-O-(CH_2CH_2O)_p-SO_3M \quad (1)$$

In Formula (1), $R^1$ is an alkyl group, M is a monovalent cation, and p is an integer of from 1 to 50.

$R^1$ may be a linear alkyl group or a branched alkyl group and is preferably a linear alkyl group. $R^1$ may have an unsaturated bond. The number of carbon atoms in $R^1$ is preferably from 10 to 20 and more preferably from 12 to 18. p is an integer of from 1 to 50. p is preferably an integer of from 1 to 30 and more preferably from 2 to 20 since the particle diameter of fine particles may be easily controlled within a desired range. M is a monovalent cation. M is preferably sodium ion, potassium ion, or ammonium ion, more preferably sodium ion or ammonium ion, and particularly preferably sodium ion since the particle diameter of fine particles may be easily controlled within a desired range.

The above-mentioned polyoxyethylene alkylether sulfate is preferably used together with a nonionic surfactant. In this case, a polyoxyethylene alkylether is preferably used as the nonionic surfactant since microparticulation of the color resin composition may properly progress and thus the dispersion of fine particles with excellent dispersion stability may be easily obtained.

In cases of using a surfactant, the concentration of the surfactant in the aqueous medium is preferably from 0.5% to 5.0% by mass.

In cases where the binder resin has an acidic group, specific surface area of the binder resin increases by direct microparticulation of the binder resin in the aqueous medium, therefore, pH of the aqueous medium may decrease to a range of from 3 to 4 under an influence of the acidic group exposed to a surface of fine particles. In this case, a polyester resin of the binder resin may hydrolyze or an average particle diameter of the obtained fine particles by microparticulation tends to be larger than a desired average particle diameter.

In order to suppress such a problem, preferably, a basic substance is added to the aqueous medium when preparing the dispersion of the binder resin composition that includes the fine particles containing the binder resin and the release agent. The basic substance, which is not particularly limited as long as the above-mentioned problems can be solved, may be exemplified by alkali metal hydroxides such as sodium hydroxide, potassium hydroxide, and potassium lithium; alkali metal carbonates such as sodium carbonate and potassium carbonate; alkali metal hydrogen carbonates such as sodium hydrogen carbonate and potassium hydrogen carbonate; and nitrogen-containing polar organic solvents such as N,N-dimethyl ethanolamine, N,N-diethyl ethanol amine, triethanol amine, tripropanol amine, tributanol amine, triethyl amine, n-propylamine, n-butylamine, isopropylamine, monomethanol amine, morpholine, methoxy propylamine, pyridine, and vinyl pyridine.

In accordance with another method, after the binder resin composition prepared as described above is dissolved in a suitable solvent, the solution of the binder resin composition is dispersed and emulsified into an aqueous medium added with a surfactant using a device such as a homogenizer followed by treatment for solvent removal, thereby an aqueous-medium dispersion of fine particles containing the binder resin and the release agent can be prepared.

The fine particles containing the binder resin and the release agent can also be prepared by a so-called phase-transfer emulsification method. Specifically, fine particles containing the binder resin and the release agent can be obtained using the method below.

Initially, the binder resin composition obtained from the above-mentioned method is dissolved in a suitable solvent, then the obtained solution is neutralized by adding a basic substance. Water is added to the neutralized solution to cause phase transformation and is then subjected to solvent removal by stirring with heat, thereby an aqueous-medium dispersion of fine particles containing the binder resin and the release agent can be prepared.

(Preparation of Dispersion of Binder Resin Composition Including Fine Particles Containing Binder Resin)

The method of preparing the dispersion of the binder resin composition including fine particles containing the binder resin and the release agent is explained as described above; a dispersion of fine particle containing the binder resin (not containing the release agent) can be prepared similarly to the method described above except that the binder resin is not compounded with the release agent. In cases where the binder resin is an addition polymerization type resin, the dispersion of the binder resin composition including fine particles containing the binder resin can also be prepared by the method below. Specifically, when the binder resin is an addition polymerization type resin such as (meth)acrylic resin and styrene-(meth)acrylic resin, fine particles containing the binder resin can be prepared from the resin as an aqueous-medium dispersion through an emulsion polymerization process.

(Preparation of Dispersion of Release Agent Containing Release Agent Fine Particles)

Preliminarily, the release agent is coarsely pulverized into about 100 μm or less. The coarsely pulverized product of the release agent is added to an aqueous medium containing a surfactant, and the obtained slurry is heated to no lower than the melting point of the release agent. A strong shear force is applied to the hot slurry using a homogenizer or a pressure-discharge type disperser, thereby preparing a dispersion of fine particles containing the release agent.

The device to apply a strong shear force to the dispersion may be exemplified by NANO3000 (by Beryu Co.), NANO-MIZER (by Yoshida Kikai Co.), MICROFLUIDIZER (by MFI Co.), GAULIN HOMOGENIZER Gaulin homogenizer (Manton-Gaulin Co.), and CLEARMIX W-MOTION (by M. Technique Co.).

Typically, in many cases, melting point of the release agent is no higher than 100° C.; in such cases, the release agent can be made into fine particles using a conventional homogenizer while heating to no lower than the melting point under atmospheric pressure. In cases where the melting point of the release agent is higher than 100° C., the release agent can be made into fine particles using a pressure-resistant device.

Preferably, volume average particle diameter (D50) of the release agent fine particles in the dispersion of the release agent is no greater than 1.0 μm. When the volume average particle diameter (D50) of the release agent fine particles is no greater than 1.0 μm, the toner for electrostatic latent image development having a uniform shape and a sharp particle size distribution may be easily prepared. More preferably, the volume average particle diameter (D50) of the release agent fine particles is from 0.1 μm to 0.5 μm. By adjusting the volume average particle diameter (D50) of release agent fine particles within this range, the above-mentioned effect may be further promoted.

(Preparation of Dispersion of Pigment Containing Pigment Fine Particles)

The pigment fine particles in the dispersion of the pigment have an average primary particle diameter of 50 nm or less, a Cv value of less than 20%, and an average circularity of 0.900 or more. The method of producing the dispersion of the pigment containing the pigment fine particles, which is not particularly limited, is preferably a method using the microreactor described above.

The dispersion of the pigment is prepared by mixing a first pigment raw liquid supplied from a first raw liquid supply portion and a second pigment raw liquid supplied from a second raw liquid supply portion and depositing a pigment in the microreactor. Hereinafter, the microreactor and preparation of the dispersion of the pigment using the microreactor are explained with reference to FIG. 2.

<Microreactor>

Figure 2:
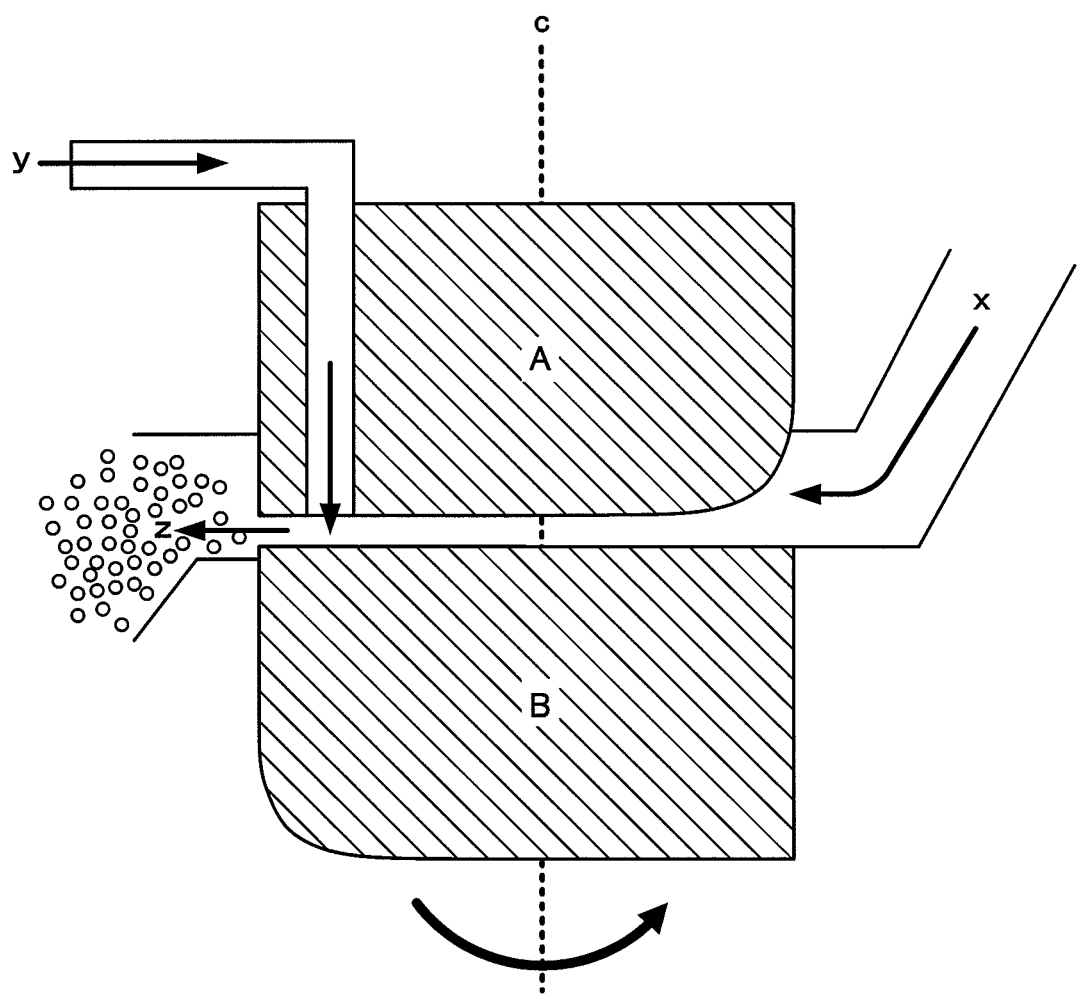
FIG. 2 is a schematic cross-sectional view of a microreactor used for preparing a dispersion of a pigment.

FIG. 2 is a schematic cross-sectional view of a microreactor used for preparing the dispersion of the pigment containing the pigment fine particles. As shown in FIG. 2, the microreactor has two circular disks of the fixed disk A and the rotatable disk B. The fixed disk A and the rotatable disk B are disposed such that a thin layer is formed therebetween. The thickness of the thin layer is preferably from 1 μm to 100 μm.

The fixed disk A with a floating structure movable to a direction parallel to the rotation axis c is employed in the microreactor shown in FIG. 2. For this reason, the thickness of the thin layer between the fixed disk A and the rotatable disk B is adjusted by a pressure that occurs through inflow of the first pigment raw liquid supplied from the first raw liquid supply portion and acts to push up the fixed disk A (upward direction in FIG. 2), a weight of the fixed disk A itself, and a pressure that is applied in a direction to push down the fixed disk A (downward direction in FIG. 2). That is, the thickness of the thin layer between the fixed disk A and the rotatable disk B can be controlled by adjusting a flow rate of the first pigment raw liquid, a mass of the fixed disk A, and/or a back pressure acting on the fixed disk A from an upper side of the fixed disk A. The pressure to the fixed disk A from an upper side thereof may be exemplified by a back pressure applied using a gas.

The material of the fixed disk A and the rotatable disk B is not particularly limited as long as corrosion thereof due to the first or second raw liquid is unlikely to occur and strength thereof is sufficient. The material of the fixed disk A and the rotatable disk B may be exemplified by carbon and silicon carbide, or materials with excellent chemical resistance such as hastelloy, glass, ceramics, and fluorine resin.

Preferably, the thickness of the thin layer between the fixed disk A and the rotatable disk B is adjusted depending on the types of the first pigment raw liquid, the second pigment raw liquid, and pigment fine particles to be deposited. The thickness of the thin layer when preparing the dispersion of the pigment is more preferably from 0.5 μm to 50 μm and particularly preferably from 1 μm to 10 μm.

The rotatable disk B is rotated around a rotation axis c, as its center, that runs through the centers of the fixed disk A and the rotatable disk B. Rotation speed of the rotatable disk B, which is not particularly limited, is preferably from 200 rpm to 4,000 rpm and more preferably from 300 rpm to 3,600 rpm when preparing the dispersion of the pigment containing the pigment fine particles.

The number of the second raw liquid supply portions y provided at the fixed disk A may be one or two or more. When the number of the second raw liquid supply portion y is two or more, one or two or more types of the second pigment raw liquid may be supplied from the second raw liquid supply portions. Shape of the second raw liquid supply portion y may be appropriately designed considering the feed rate of the second pigment raw liquid.

By use of the microreactor described above, the pigment fine particles with a uniform shape and a sharp particle size distribution can be prepared. The microreactor equipped with the configuration described above may be exemplified by a device such as a forced thin film reactor (ULREA SS-11, by M. Technique Co.). Hereinafter, preparation of the dispersion of the pigment containing pigment fine particles using the microreactor is explained.

(Preparation of Dispersion of Pigment Using Microreactor)

When preparing the dispersion of the pigment using the microreactor, initially, as shown in FIG. 2, the first pigment raw liquid is supplied from the first raw liquid supply portion x, thereby the space between the fixed disk A and the rotatable disk B is filled with the first pigment raw liquid to form a thin film fluid. Next, the second pigment raw liquid, from the second raw liquid supply portion y shown in FIG. 2, is supplied to the thin film fluid of the first pigment raw liquid, and the first pigment raw liquid and the second pigment raw liquid are mixed within the thin layer between the fixed disk A and the rotatable disk B, thereby depositing the pigment fine particles. The deposited pigment fine particles are collected at the liquid discharge portion z as the dispersion of the pigment where the pigment fine particles are dispersed in an aqueous medium.

Preferably, the first pigment raw liquid, used for preparing the dispersion of the pigment, is water or an alkaline aqueous solution. The alkaline aqueous solution may be exemplified by aqueous ammonia, aqueous sodium hydroxide solution, and aqueous potassium hydroxide solution.

The second pigment raw liquid, used for preparing the dispersion of the pigment, is a pigment solution where a pigment is dissolved in a solvent. The solvent to solve the pigment is not particularly limited as long as the pigment can be properly solved. Organic solvents and acidic aqueous solutions are preferable examples of the solvent to solve the pigment, and the solvent is preferably an acidic aqueous solution. Specific examples of the acidic aqueous solution may be exemplified by sulfuric acid, hydrochloric acid, nitric acid, and trifluoroacetic acid; particularly preferably, a strong acid such as concentrated sulfuric acid with a concentration of no less than 95% is used.

In regards to the method of preparing the dispersion of the pigment as described above, an acid pasting method is preferable in which an aqueous acidic solution of a pigment (second pigment raw liquid) and water or an alkaline aqueous solution (first pigment raw liquid) are mixed to deposit the pigment fine particles.

In regards to a method other than the acid pasting method, a method is also preferable in which an organic solvent solution of a pigment is used as the second pigment raw liquid and a poor solvent of the pigment is used as the first pigment raw liquid and the first pigment raw liquid and the second pigment raw liquid are mixed to deposit the pigment. Preferable examples of the organic solvent in the second pigment raw liquid may be exemplified by aprotic polar organic solvents such as N-methyl-2-pyrrolidone, dimethyl formamide, dimethyl acetamide, dimethyl sulfoxide, and sulfolane. Preferable examples of the poor solvent used in the first pigment raw liquid may be exemplified by water, methanol, ethanol, aqueous methanol solution, and aqueous ethanol solution.

In order to control crystal form or crystal size when depositing the pigment, conventional organic solvents, polymer compounds, or surfactants may be added to the first pigment raw liquid and the second pigment raw liquid.

It is also preferred that the dispersion of the pigment and an alkaline aqueous solution such as aqueous sodium hydroxide solution are mixed at the liquid discharge portion z where the dispersion of the pigment is collected. Surfaces of the pigment fine particles can be made hydrophilic by treating in this way. The hydrophilized pigment fine particles may be easily dispersed when using a surfactant. For this reason, the dispersion of the pigment fine particles with excellent dispersion stability may be easily obtained by hydrophilizing the pigment fine particles.

Typically, the feed rate of the first pigment raw liquid depends on a configuration of the microreactor and is preferably from 100 to 1,000 mL/min. Typically, the feed rate of the second pigment raw liquid depends on the feed rate of the first pigment raw liquid and is preferably from 1 to 500 mL/min. Temperature of the first pigment raw liquid and the second pigment raw liquid when being supplied depends on the pigment raw liquids used and is typically from 0° C. to 50° C.

The Cv value of pigment fine particles can be lowered by increasing a back pressure applied from upper side of the fixed disk A, by increasing a rotation number of the rotatable disk B, or by decreasing the feed rate of the second pigment raw liquid.

As described above, the method to obtain the dispersion of the pigment by mixing the first pigment raw liquid and the second pigment raw liquid to deposit the pigment fine particles using the microreactor is explained; here, the dispersion of the pigment may also be obtained using a method of mixing two or more pigment raw liquids containing a synthetic raw material of a pigment and then depositing the pigment obtained from a chemical reaction thereof as fine particles. A specific example of such a method may be exemplified by a method of mixing a pigment raw liquid containing a diazonium salt and a pigment raw liquid containing a coupler and depositing fine particles of an azo pigment in the microreactor.

As described above, the pigment fine particles in the dispersion of the pigment have an average primary particle diameter of 50 nm or less, a Cv value of less than 20%, and an average circularity of 0.900 or more. By use of the dispersion containing the pigment fine particles as a raw material, the toner for electrostatic latent image development having a uniform shape and a sharp particle size distribution may be easily prepared.

The average primary particle diameter and the Cv value of pigment fine particles can be determined by measuring a particle size distribution of pigment fine particles using a device such as a particle size distribution analyzer (MICROTRAC UPA 150, by Nikkiso Co.). The average circularity of pigment fine particles can be determined on the basis of a TEM image of pigment fine particles.

[Aggregation of Fine Particles]

The dispersion of fine particles, prepared by the method described above, is made into fine particle aggregates in an appropriate combination such that the obtained toner contains predetermined components. A preferable method to aggregate the fine particles may be exemplified by a method to add an aggregating agent to the aqueous-medium dispersion of the fine particles.

Examples of the aggregating agent may be exemplified by inorganic metal salts, inorganic ammonium salts, and divalent or higher metal complexes. The inorganic metal salt may be exemplified by metal salts such as sodium sulfate, sodium chloride, calcium chloride, calcium nitrate, barium chloride, magnesium chloride, zinc chloride, aluminum chloride, and aluminum sulfate; and inorganic metal salt polymers such as poly aluminum chloride and poly aluminum hydroxide. The inorganic ammonium salt may be exemplified by ammonium sulfate, ammonium chloride, and ammonium nitrate. Cationic surfactants of quaternary ammonium salt type and polyethylenimines may also be used as the aggregating agent.

Divalent metal salts and monovalent metal salts are preferably used as the aggregating agent. Preferably, the divalent metal salt and the monovalent metal salt are used in combination. Since the divalent metal salt and the monovalent metal salt provide different aggregation rates to fine particles, when used in combination thereof, the particle size distribution may be easily made sharp along with controlling the particle diameter of the obtained fine particle aggregates.

The additive amount of the aggregating agent, which is not particularly limited within a range not inhibiting the purpose of the present disclosure, is preferably from 0.1 to 10 mmol/g based on solid content of the dispersion of the fine particles. Preferably, the additive amount of the aggregating agent is appropriately adjusted depending on the type and the amount of the surfactant in the dispersion of the fine particles.

The aggregating agent is added at a temperature of no higher than the glass transition point of the binder resin after adjusting the pH of the dispersion of the fine particles. When the binder resin is a polyester resin in particular, it is preferred that the aggregating agent is added after adjusting the pH of the fine particle dispersion to an alkali side of preferably pH 10 or higher. Fine particles can be uniformly aggregated by the above-mentioned process, thus the particle size distribution of the fine particle aggregates can be made shape. The aggregating agent may be added at one time or gradually.

After the fine particle aggregates have aggregated into ones with an intended particle diameter; preferably, a aggregation-terminating agent is added. The aggregation-terminating agent may be exemplified by sodium chloride and sodium hydroxide. In this way, the fine particle aggregates can be obtained.

[(II) Shape Control Step]

In the shape control step (II), the components in the fine particle aggregates formed from the aggregation step (I) are coalesced to thereby control the shape of the obtained toner.

In the shape control step (II), the temperature at the time of heating the aqueous-medium dispersion of the fine particle aggregates is preferably from the glass transition point of the binder resin to the melting point of the binder resin and more preferably from a temperature 10° C. higher than the glass transition point of the binder resin to the melting point of the binder resin. By heating the dispersion of the fine particle aggregates in the aqueous-medium dispersion within this range, coalescence of the components in the fine particle aggregates can satisfactorily progress and thus the toner having a good sphericity may be easily prepared.

As the aqueous-medium dispersion of the fine particle aggregates is heated, the shape of the fine particle aggregates gradually comes to be spherical. By controlling the temperature and the time during the heating, the sphericity of the particles can be controlled into an intended value. This is because melt viscosity of the binder resin decreases as the temperature rises and thus the shape of particles deforms toward a spherical shape by action of surface tension. Preferable range of the sphericity is from 0.965 to 0.985. The sphericity can be measured using FPIA3000 (by Sysmex Co.), for example. In this way, the dispersion of toner particles having desirable particle diameter and shape can be obtained.

The toner particles obtained from the shape control step (II) may be collected by any process and is favorably used as a toner for various image forming apparatuses.

[(III) Cleaning Step]

The toner particles obtained from the shape control step (II) are cleaned with water in a cleaning step (III) as required. The cleaning process, which is not particularly limited, may be exemplified by a process in which the toner particles are recovered from the dispersion of toner particles as a wet cake through solid-liquid separation and the separated wet cake is washed with water, a process in which the toner particles in the dispersion is precipitated and the separated supernatant solution is substituted with water followed by re-dispersing the toner particles in water, and the like.

[(IV) Drying Step]

The toner particles obtained from the shape control step (II) are dried in a drying step (IV) as required. The method of drying the toner particles is not particularly limited. Preferable drying processes may be exemplified by those using a dryer such as spray dryer, fluidized-bed dryer, vacuum freeze dryer, and decompression dryer. Among these processes, the process using a spray dryer is more preferable since agglomeration of toner particles during drying may be easily suppressed. When using the spray dryer, an external additive can be attached to a surface of toner particles by spraying a dispersion of the external additive such as silica together with the dispersion of toner particles.

[(V) External Addition Step]

The toner for electrostatic latent image development produced by the method of the present disclosure may have adhered thereto an external additive on its surface as required. The method of adhering the external additive to the surface of the toner particles is not particularly limited. A preferable method may be exemplified by a method of mixing it while adjusting a mixing condition such that the external additive is not embedded into the surface of the toner using a mixer like HENSCHEL MIXER or NAUTA MIXER.

In accordance with the method of the present disclosure described above, there can be provided a method of producing a toner which is excellent in low-temperature fixability and storage stability at high temperatures and a toner obtained from the method. For this reason, the toner for electrostatic latent image development produced by the method of the present disclosure is favorably used for various image forming apparatuses.

EXAMPLES

The present disclosure is explained more specifically with reference to examples below. In addition, the present disclosure is not limited to the examples.

Preparation Example 1

Preparation of Dispersion of Binder Resin

A dispersion of a binder resin was prepared in accordance with the method below.

The amorphous polyester resin shown below was used as a binder resin.

monomer composition: polyoxypropylene (2,2)-2,2-bis(4-hydroxyphenyl)propane/polyoxyethylene (2,0)-2,2-bis(4-hydroxyphenyl)propane/fumaric acid/trimellitic acid=25/25/46/4 (mole ratio)

number average molecular mass (Mn): 2,500
mass average molecular mass (Mw): 6,500
molecular mass distribution (Mw/Mn): 2.6
softening point: 91° C.
glass transition point (Tg): 51° C.
acid value: 15.5 mg KOH/g 100 parts by mass of a coarsely pulverized product with an average particle diameter of 10 μm obtained by coarsely pulverizing the binder resin using a TURBO MILL T250 (Turbo Kogyo Co.), 2 parts by mass of an anionic surfactant (EMAL E27C, by Kao Co.), and 50 parts by mass of 0.1 N aqueous sodium hydroxide solution (basic substance) were mixed, and ion-exchange water as an aqueous medium was further added thereto, thereby preparing a slurry of 500 parts by mass in total. The obtained slurry was poured into a pressure-proof round-bottom stainless container, and the slurry was shear-dispersed for 30 minutes at a rotor rotation number of 20,000 rpm while warming the slurry to 145° C. under a pressure of 0.5 MPa (G) using a high-speed shearing emulsifier CLEAR MIX (CLM-2.2S, by M. Technique Co.). Then, the slurry was cooled at a rate of 5° C./min while continuing the stirring at a rotor rotation number of 15,000 rpm until the temperature in the stainless container was lowered to 50° C., thereby obtaining a dispersion of the binder resin (R-1).

Preparation Example 2

Preparation of Dispersion of Release Agent

A dispersion of a release agent was prepared in accordance with the method below.

200 parts by mass of a release agent (WEP-5, pentaerythritol behenic acid ester wax, melting point 84° C., by NOF Co.), 2 parts by mass of an anionic surfactant (EMAL E27C, by Kao Co.), and 800 parts by mass of ion-exchange water were mixed, and the mixture was heated to 100° C. to melt the release agent, followed by emulsifying for 5 minutes using a homogenizer (ULTRA-TURRAX T50, by IKA Co.). Next, the mixture was subjected to emulsifying treatment two times under a condition of 120° C. and discharge pressure 100 MPa using a high-pressure type homogenizer (NANOMIZER NV-200, by Yoshida Kikai Co.). In the high-pressure type homogenizer, a plunger diameter of a pressure head was set to φ10 mm, and a penetrating nozzle of 120 μm was used as a generator. In this way, a dispersion of the release agent (W-1) with an average particle diameter of 250 nm, a melting point of 83° C., and a solid content concentration of 20% by mass was obtained.

Example 1

Preparation of Dispersion of Pigment

A dispersion of a pigment was prepared using a forced thin film reactor (ULREA SS-11, by M. Technique Co.) as a microreactor by an acid pasting method.

A solution of copper phthalocyanine pigment with concentration of 3% by mass in concentrated sulfuric acid (concentration: 98% by mass) as a second pigment raw liquid was obtained by dissolving a cyan pigment (C.I. pigment blue 15:3, copper phthalocyanine) in concentrated sulfuric acid (concentration: 98% by mass).

A device condition of the microreactor was set as shown below, water was used as a first pigment raw liquid, the first pigment raw liquid was supplied from a first raw liquid supply portion x under the condition below, and the second pigment raw liquid was supplied from a second raw liquid supply portion y under the condition below.
<Device Condition>
process supply pressure: 0.3 MPa
back pressure: 0.02 MPa
disk rotation speed: 1,700 rpm
<Condition at First Raw Liquid Supply Portion>
liquid temperature: 5° C.
flow rate: 400 mL/min
<Condition at Second Raw Liquid Supply Portion>
flow rate: 3 mL/min Next, at a liquid discharge portion z with a cooling jacket, a 6N aqueous NaOH solution was flowed into the obtained pigment fine particles under a condition of flow rate 24 mL/min and liquid temperature 10° C. The pigment fine particles and the aqueous NaOH solution were quickly mixed under a condition of jacket-cooling water temperature 10° C., thereby treating a surface of the pigment fine particles to introduce a hydrophilic group.

The obtained mixed liquid was stirred under a condition of wing circumferential velocity 1 m/sec, mixing period 2 hours, and jacket temperature 20° C. using a stirring device (THREE-ONE MOTOR Type 600G, stirring wing: impeller type, by Shinto Scientific Co.), and a wet cake of the pigment fine particles was collected by filtering the mixed liquid using a membrane filter (pore diameter 1 μm) in a state that the pigment fine particles had formed a flocculate. Next, the collected wet cake of the pigment fine particles and an aqueous solution of 0.5% by mass sodium dodecyl sulfate were poured into a CLEAR MIX (by M. Technique Co.), then the pigment fine particles were re-dispersed for 5 minutes at a rotation speed of 20,000 rpm, thereby obtaining a dispersion of the pigment (P-1).

The particle size distribution of pigment fine particles in the obtained dispersion of the pigment was measured using a particle size distribution analyzer (MICROTRAC UPA 150, by Nikkiso Co.). The pigment fine particles in the obtained dispersion of the pigment had an average primary particle diameter of 22 nm and a Cv value of 13% in the particle size distribution. It was confirmed from a TEM image of the pigment fine particles that the average circularity was 0.940. The Cv value and the average circularity can be determined in accordance with the formulas below. The Cv value gives an indication of broadness of particle size distribution and a lower Cv value means a sharper particle size distribution.

$Cv$ value=100×(standard deviation)/(volume average particle diameter)

Circularity=$4\pi S/L^2$ ($S$: area, $L$: boundary length)

Circularity=$4\pi S/L^2$ ($S$: area, $L$: boundary length)

(Aggregation Step)

425 g of the dispersion of the binder resin (R-1), 50 g of the dispersion of the release agent (W-1), and 50 g of the dispersion of the pigment (P-1) were introduced into a stainless round-bottom flask of volume 2 L, and these were mixed at 25° C. Then, 1 g of 1N aqueous sodium hydroxide solution was introduced into the flask while stirring the content of the flask at a velocity of 200 rpm using a stirring blade. Next, the content of the flask was stirred at 25° C. for 10 minutes, then 30 g of an aggregating agent (aqueous magnesium chloride hexahydrate solution, concentration: 50.0% by mass) was added to the flask over 5 minutes. After adding the aggregating agent, the temperature in the flask was raised to 50° C. at a temperature-increase rate of 0.2° C./min, and the content of the flask was stirred at 50° C. for 30 minutes, thereby aggregating fine particles. Next, 50 g of an aqueous sodium chloride solution of concentration 20% by mass was added to the flask at one time to stop the aggregation of the fine particles, thereby obtaining a dispersion of fine particle aggregates.

(Shape Control Step)

100 g of 5% sodium dodecyl sulfate aqueous solution was added to the obtained dispersion of fine particle aggregates, the dispersion of fine particle aggregates was heated from 50° C. to 65° C. at a temperature-increase rate of 0.2° C./min, and the dispersion of fine particle aggregates was stirred at 65° C. for 1 hour to coalesce the fine particle aggregates, thereby controlling the toner shape into a spherical shape. Next, the temperature in the flask was lowered at a temperature-decrease rate of 10° C./min, and the temperature in the flask was set to 25° C. At this time, the toner particles in the toner dispersion within the flask had an average primary particle diameter of 5.5 μm and a sphericity of 0.978.

(Cleaning Step)

The toner dispersion was suction-filtered and a wet cake of the toner was collected by filtering. The wet cake was re-dispersed in ion-exchange water to clean the toner. Similar procedures were repeated 5 times to clean the toner, then the collected wet cake of the toner was dried in a next step.

(Drying Step)

The wet cake of the toner was dispersed in an aqueous ethanol solution of concentration 50% by mass to prepare a slurry. The obtained slurry was dried using a continuous surface-modifying device (COATMIZER, by Freund Sangyo Co.), thereby obtaining a toner.

(External Addition Step)

100 parts by mass of the dried powder obtained from the drying step and 2 parts by mass of hydrophobic silica (REA-90, by Nippon Aerosil Co.) were mixed for 5 minutes using a HENSCHEL MIXER (by Mitsui Miike Machinery Co.) and then screened through a 300 mesh screen (opening 48 μm), thereby obtaining a toner of Example 1.

The toner of Example 1 obtained in this way was measured for volume average particle diameter (MV), spherical degree, and MV/MN value using the particle size distribution analyzer (MICROTRAC UPA 150, by Nikkiso Co.). The volume average particle diameter (MV) was 5.5 μm, the sphericity was 0.978, and the MV/MN value was 1.2.

The toner of Example 1 was evaluated for particle size distribution and charge amount distribution in accordance with the methods below. Evaluation results of the toner of Example 1 are shown in Table 2.
<Particle Size Distribution>

The particle size distribution was evaluated on the basis of a MV/MN value of toner based on the criteria below.
Good: MV/MN value is no greater than 1.5; and
Bad: MV/MN value is greater than 1.5.
<Charge Amount Distribution>
(Preparation of Carrier)

Raw materials in the amounts of 39.7 mol % as MnO, 9.9 mol % as MgO, 49.6 mol % as $Fe_2O_3$, and 0.8 mol % as SrO were compounded, water was added thereto, and the mixture was milled and mixed for 10 hours in a wet-type ball mill. The obtained mixture was dried and then maintained at 950° C. for 4 hours. Next, the mixture was milled for 24 hours in a wet-type ball mill, thereby preparing a slurry. After the slurry was granulated and dried, the granules were maintained at 1270° C. for 6 hours in an atmosphere of oxygen concentration 2%, then which were subjected to disintegration and size adjustment, thereby obtaining manganese ferrite particles (carrier core). The obtained manganese ferrite particles had an average particle diameter of 35 µm and a saturated magnetization of 70 Am$^2$/kg at an applied magnetic field of 3,000 ($10^3$/4π·A/m).

Next, a polyamide-imide resin (copolymer of trimellitic anhydride and 4,4'-diaminodiphenyl methane) was diluted with methyl ethyl ketone to prepare a resin solution, then tetrafluoroethylene-hexafluoropropylene copolymer (FEP) and silicon oxide (2% by mass based on the total amount of resin) were dispersed in the resin solution, thereby obtaining a carrier coating liquid of 1 kg corresponding to 150 g as a solid content. A mass ratio of the polyamide-imide resin to FEP (polyamide-imide resin/FEP) was ⅔, and the solid content concentration of the resin solution was 10% by mass.

10 kg of the manganese ferrite particles was coated with the obtained carrier coating liquid using a fluidized-bed coating device (SPIRACOATER SP-25, by Okada Seiko Co.). Then, the manganese ferrite particles coated with the resin were calcined at 220° C. for 1 hour, thereby obtaining a resin-coated ferrite carrier having a coated resin amount of 3% by mass.

(Preparation of Two-Component Developer)

The obtained resin-coated ferrite carrier and the toner of Example 1 were introduced into a TURBULA MIXER (by Shinmaru Enterprises Co.) and mixed for 5 minutes such that the concentration of the toner was 7% by mass in a two-component developer, thereby preparing the two-component developer to be evaluated.

A color printer (FS-05400DN, by Kyocera Mita Co.) was used as an evaluating device. 3 g of the obtained two-component developer was set in a rotatable Mag Roller, a cylinder-type electrode was disposed oppositely to the Mag Roller with a gap of 5 mm therebetween while rotating the Mag Roller at 500 rpm, and a toner layer separated electrolytically under an electrical field strength of 1 kV/cm was collected, then the collected toner layer was introduced into an E-SPURT ANALYXER (Model EST-III, by Hosokawa Micron Co.), and an average charge amount X (µC/g) was measured. A charge amount distribution was evaluated from the measured average charge amount X (µC/g) and a standard deviation y.

Good: y≤3.5×X
Bad: y>3.5×X

Example 2

Preparation of Dispersion of Pigment

A dispersion of a pigment was prepared using a forced thin film reactor (ULREA SS-11, by M. Technique Co.) as a microreactor by an acid pasting method.

As a second pigment raw liquid, a magenta pigment (C.I. pigment red 122) was dissolved in a mixed solution of dimethyl sulfoxide and potassium hydroxide to obtain a mixed turbid solution consisting of 2% by mass of quinacridone magenta pigment, 82% by mass of dimethyl sulfoxide, and 16% by mass of 8N aqueous potassium hydroxide solution.

A device condition of the microreactor was set as shown below, water was used as a first pigment raw liquid, the first pigment raw liquid was supplied from a first raw liquid supply portion x under the condition below, and the second pigment raw liquid was supplied from a second raw liquid supply portion y under the condition below.

<Device Condition>
process supply pressure: 0.3 MPa
back pressure: 0.02 MPa
disk rotation speed: 1,500 rpm
<Condition at First Raw Liquid Supply Portion>
liquid temperature: 20° C.
flow rate: 400 mL/min
<Condition at Second Raw Liquid Supply Portion>
flow rate: 3 mL/min The pH of the dispersion of pigment fine particles collected at the liquid discharge portion z was 11.6. Then, the obtained dispersion of pigment fine particles was stirred under a condition of wing circumferential velocity 1 m/sec, mixing period 2 hours, and jacket temperature 20° C. using the stirring device (THREE-ONE MOTOR Type 600G, stirring wing: impeller type, by Shinto Scientific Co.), and a wet cake of the pigment fine particles was collected by filtering the mixed liquid using a membrane filter (pore diameter 1 µm) in a state that the pigment fine particles had formed a flocculate. Next, the collected wet cake of the pigment fine particles and an aqueous solution of 0.5% by mass sodium dodecyl sulfate were poured into a CLEAR MIX (by M. Technique Co.), then the pigment fine particles were re-dispersed for 5 minutes at a rotation speed of 20,000 rpm, thereby obtaining a dispersion of the pigment (P-2).

The particle size distribution of pigment fine particles in the obtained dispersion of the pigment was measured using the particle size distribution analyzer (MICROTRAC UPA 150, by Nikkiso Co.). The pigment fine particles in the obtained dispersion of the pigment had an average primary particle diameter of 13 nm and a Cv value of 17% in the particle size distribution. It was confirmed from a TEM image of the pigment fine particles that the average circularity was 0.970.

A toner of Example 2 was obtained similarly to Example 1 except that the dispersion of the pigment(P-2) was used in place of the dispersion of the pigment (P-1) in the aggregation, the shape control, the cleaning, the drying, and the external addition steps.

The obtained toner of Example 2 was measured for volume average particle diameter (MV), spherical degree, and MV/MN value similarly to Example 1. The volume average particle diameter (MV) was 5.5 µm, the sphericity was 0.975, and the MV/MN value was 1.2.

The toner of Example 2 was evaluated for particle size distribution and charge amount distribution similarly to Example 1. Evaluation results of the toner are shown in Table 2.

Example 3

Preparation of Dispersion of Pigment

Using a forced thin film reactor (ULREA SS-11, by M. Technique Co.) as a microreactor, a dispersion of a pigment (P-3) was prepared by an acid pasting method similarly to Example 1 except that device condition was changed to that below. In the preparation of the dispersion of the pigment, the pigment fine particles were also subjected to a treatment to introduce a hydrophilic group using an aqueous NaOH solution and a re-dispersion treatment similarly to Example 1.

<Device Condition>
process supply pressure: 0.3 MPa
back pressure: 0.04 MPa
disk rotation speed: 2,500 rpm
<Condition at First Raw Liquid Supply Portion>
liquid temperature: 25° C.
flow rate: 400 mL/min
<Condition at Second Raw Liquid Supply Portion>
flow rate: 3 mL/min The particle size distribution of pigment fine particles in the obtained dispersion of the pigment was measured using the particle size distribution analyzer (MICROTRAC UPA 150, by Nikkiso Co.). The pigment fine particles in the obtained dispersion of the pigment had an average primary particle diameter of 46 nm and a Cv value of 18% in the particle size distribution. It was confirmed from a TEM image of the pigment fine particles that the average circularity was 0.955.

(Aggregation Step, Shape Control Step, Cleaning Step, Drying Step, and External Addition Step)

A toner of Example 3 was obtained similarly to Example 1 except that the dispersion of the pigment (P-3) was used in place of the dispersion of the pigment (P-1) in the aggregation, the shape control, the cleaning, the drying, and the external addition steps.

The obtained toner of Example 3 was measured for volume average particle diameter (MV), spherical degree, and MV/MN value similarly to Example 1. The volume average particle diameter (MV) was 5.7 μm, the sphericity was 0.973, and the MV/MN value was 1.3.

The toner of Example 3 was evaluated for particle size distribution and charge amount distribution similarly to Example 1. Evaluation results of the toner are shown in Table 2.

Comparative Example 1

Preparation of Dispersion of Pigment 90 parts by mass of a cyan pigment (C.I. pigment blue 15:3, copper phthalocyanine) as a pigment, 10 parts by mass of an anionic surfactant (sodium dodecyl sulfate), and 400 parts by mass of ion-exchange water were mixed, and the mixture was emulsified and dispersed for 1 hour using a high-pressure impact type disperser ULTIMAIZER (HJP30006, by Sugino Machine Co.), thereby obtaining a dispersion of the pigment (P-4).

The particle size distribution of pigment fine particles in the obtained dispersion of the pigment was measured using the particle size distribution analyzer (MICROTRAC UPA 150, by Nikkiso Co.). The pigment fine particles in the obtained dispersion of the pigment had an average primary particle diameter of 160 nm and a Cv value of 25% in the particle size distribution. It was confirmed from a TEM image of the pigment fine particles that the average circularity was 0.800.

(Aggregation Step, Shape Control Step, Cleaning Step, Drying Step, and External Addition Step)

A toner of Comparative Example 1 was obtained similarly to Example 1 except that the dispersion of the pigment (P-4) was used in place of the dispersion of the pigment (P-1) in the aggregation, the shape control, the cleaning, the drying, and the external addition steps.

The obtained toner of Comparative Example 1 was measured for volume average particle diameter (MV), spherical degree, and MV/MN value similarly to Example 1. The volume average particle diameter (MV) was 6.5 μm, the sphericity was 0.96, and the MV/MN value was 2.4.

The toner of Comparative Example 1 was evaluated for particle size distribution and charge amount distribution similarly to Example 1. Evaluation results of the toner are shown in Table 2.

Comparative Example 2

A dispersion of a pigment (P-5) used for Comparative Example 2 was obtained similarly to Comparative Example 1 except that a magenta pigment (C.I. pigment red 122) was used as a pigment.

The particle size distribution of pigment fine particles in the obtained dispersion of the pigment was measured using the particle size distribution analyzer (MICROTRAC UPA 150, by Nikkiso Co.). The pigment fine particles in the obtained dispersion of the pigment had an average primary particle diameter of 180 nm and a Cv value of 29% in the particle size distribution. It was confirmed from a TEM image of the pigment fine particles that the average circularity was 0.820.

(Aggregation Step, Shape Control Step, Cleaning Step, Drying Step, and External Addition Step)

A toner of Comparative Example 2 was obtained similarly to Example 1 except that the dispersion of the pigment (P-5) was used in place of the dispersion of the pigment (P-1) in the aggregation, the shape control, the cleaning, the drying, and the external addition steps.

The obtained toner of Comparative Example 2 was measured for volume average particle diameter (MV), spherical degree, and MV/MN value similarly to Example 1. The volume average particle diameter (MV) was 6.5 μm, the sphericity was 0.96, and the MV/MN value was 2.2.

The toner of Comparative Example 2 was evaluated for particle size distribution and charge amount distribution similarly to Example 1. Evaluation results of the toner are shown in Table 2.

Comparative Example 3

A dispersion of a pigment was prepared by an acid pasting method.

A solution of copper phthalocyanine pigment in concentrated sulfuric acid (concentration: 98% by mass) obtained by dissolving cyan pigment (C.I. pigment blue 15:3, copper phthalocyanine) in concentrated sulfuric acid (concentration: 98% by mass) was poured into the stirring device (THREE-ONE MOTOR Type 600G, stirring wing: impeller type, by Shinto Scientific Co.) together with 1 L of water at a temperature of 10° C. while stirring at a wing circumferential velocity of 1 m/sec.

After stirring for 30 minutes at a wing circumferential velocity of 1 m/sec, 150 g of a 6N aqueous NaOH solution was added thereto and the pigment mixed liquid was neutralized.

The obtained mixed liquid was further stirred under a condition of wing circumferential velocity 1 m/sec, mixing period 2 hours, and jacket temperature 20° C.; and a wet cake of the pigment fine particles was collected by filtering the mixed liquid using a membrane filter (pore diameter 1 μm) in a state that the pigment fine particles had formed a flocculate. Next, the collected wet cake of the pigment fine particles and an aqueous solution of 0.5% by mass sodium dodecyl sulfate were poured into a CLEAR MIX (by M. Technique Co.), then the pigment fine particles were re-dispersed under a condition of rotation speed 20,000 rpm for 5 minutes, thereby obtaining a dispersion of a pigment (P-6).

The particle size distribution of pigment fine particles in the obtained dispersion of the pigment was measured using the particle size distribution analyzer (MICROTRAC UPA 150, by Nikkiso Co.). The pigment fine particles in the obtained dispersion of the pigment had an average primary particle diameter of 45 nm and a Cv value of 20% in the particle size distribution. It was confirmed from a TEM image of the pigment fine particles that the average circularity was 0.860.

(Aggregation Step, Shape Control Step, Cleaning Step, Drying Step, and External Addition Step)

A toner of Comparative Example 3 was obtained similarly to Example 1 except that the dispersion of the pigment (P-6) was used in place of the dispersion of the pigment (P-1) in the aggregation, the shape control, the cleaning, the drying, and the external addition steps.

The obtained toner of Comparative Example 3 was measured for volume average particle diameter (MV), spherical degree, and MV/MN value similarly to Example 1. The volume average particle diameter (MV) was 6.5 μm, the sphericity was 0.972, and the MV/MN value was 2.3.

The toner of Comparative Example 3 was evaluated for particle size distribution and charge amount distribution similarly to Example 1. Evaluation results of the toner are shown in Table 2.

Comparative Example 4

Preparation of Dispersion of Pigment

A dispersion of a pigment (p-7) was prepared by an acid pasting method using the forced thin film reactor (ULREA SS-11, by M. Technique Co.) as a microreactor similarly to Example 1 except that the device condition was changed to that shown below. In the preparation of the dispersion of the pigment, the pigment fine particles were also subjected to a treatment to introduce a hydrophilic group using an aqueous NaOH solution and a re-dispersion treatment similarly to Example 1.
<Device Condition>
process supply pressure: 0.3 MPa
back pressure: 0.08 MPa
disk rotation speed: 3,500 rpm
<Condition at First Raw Liquid Supply Portion>
liquid temperature: 40° C.
flow rate: 400 mL/min
<Condition at Second Raw Liquid Supply Portion>
flow rate: 5 mL/min The particle size distribution of pigment fine particles in the obtained dispersion of the pigment was measured using the particle size distribution analyzer (MICROTRAC UPA 150, by Nikkiso Co.). The pigment fine particles in the obtained dispersion of the pigment had an average primary particle diameter of 62 nm and a Cv value of 23% in the particle size distribution. It was confirmed from a TEM image of the pigment fine particles that the average circularity was 0.958.
(Aggregation Step, Shape Control Step, Cleaning Step, Drying Step, and External Addition Step)

A toner of Comparative Example 4 was obtained similarly to Example 1 except that the dispersion of the pigment (P-7) was used in place of the dispersion of the pigment (P-1) in the aggregation, the shape control, the cleaning, the drying, and the external addition steps.

The obtained toner of Comparative Example 4 was measured for volume average particle diameter (MV), spherical degree, and MV/MN value similarly to Example 1. The volume average particle diameter (MV) was 6.3 μm, the sphericity was 0.969, and the MV/MN value was 2.2.

The toner of Comparative Example 4 was evaluated for particle size distribution and charge amount distribution similarly to Example 1. Evaluation results of the toner are shown in Table 2.

The average primary particle diameters, the Cv values, and the values of average circularity of the pigments in the dispersions of the pigments used for preparing the toners of Examples 1 to 3 and Comparative Examples 1 to 4 are shown in Table 1 below. In regards to the pigments in Table 1, CP represents copper phthalocyanine (C.I. pigment blue 15:3) and QM represents quinacridone magenta (C.I. pigment red 122). In regards to the devices in Table 1, A is the forced thin film reactor (ULREA SS-11, by M. Technique Co.), B is the high-pressure impact type disperser ULTIMAIZER (HJP30006, by Sugino Machine Co.), and C is the stirring device (THREE-ONE MOTOR Type 600G, stirring wing: impeller type, by Shinto Scientific Co.).

TABLE 1

| | | | Morphological characteristics of pigments in dispersion of pigment | | | |
|---|---|---|---|---|---|---|
| | Type of pigment dispersion | Type of pigment | Particle diameter [nm] | Cv value [%] | Average circularity | Type of device |
| Ex. 1 | P-1 | CP | 22 | 13 | 0.94 | A |
| Ex. 2 | P-2 | QM | 13 | 17 | 0.97 | A |
| Ex. 3 | P-3 | CP | 46 | 18 | 0.955 | A |
| Comp. ex. 1 | P-4 | CP | 160 | 25 | 0.800 | B |
| Comp. ex. 2 | P-5 | QM | 180 | 29 | 0.820 | B |
| Comp. ex. 3 | P-6 | CP | 45 | 20 | 0.86 | C |
| Comp. ex. 4 | P-7 | CP | 62 | 23 | 0.958 | A |

TABLE 2

| | Particle diameter distribution [MV/MN] | Average Charge amount X [μC/g] | Standard deviation y | Evaluation |
|---|---|---|---|---|
| Ex. 1 | 1.2 | 5.96 | 10.45 | Good |
| Ex. 2 | 1.2 | 6.02 | 18.96 | Good |
| Ex. 3 | 1.3 | 6.12 | 19.50 | Good |
| Comp. ex. 1 | 2.4 | 5.56 | 23.50 | Bad |
| Comp. ex. 2 | 2.2 | 6.10 | 25.70 | Bad |
| Comp. ex. 3 | 2.3 | 6.50 | 29.00 | Bad |
| Comp. ex. 4 | 2.2 | 6.20 | 21.80 | Bad |

It is understood from Tables 1 and 2 that the toners for electrostatic latent image development of Examples 1 to 3, which contain pigment fine particles having an average primary particle diameter of 50 nm or less, a Cv value of less than 20%, and an average circularity of 0.900 or more, are sharp in the particle size distribution and the charge amount distribution thereof.

On the other hand, it is understood that the toners for electrostatic latent image development of Comparative Examples 1 to 4, where at least one of an average primary particle diameter, a Cv value, and an average circularity is outside of the predetermined ranges, are broad in the particle size distribution and the charge amount distribution thereof.

The invention claimed is:
1. A toner for electrostatic latent image development,
wherein the toner is prepared by aggregating at least fine particles comprising a binder resin, pigment fine particles, and fine particles comprising a release agent, to thereby obtain fine particle aggregates and then coalescing the fine particle aggregates,
the binder resin is an amorphous a copolyester of 25 mole % of polyoxypropylene (2,2)-2,2-bis(4-hydroxyphenyl) propane 25 mole % of polyoxyethylene (2,0)-2,2-bis(4- hydroxyphenyl)propane, 46 mole % of fumaric acid and 4 mole % of trimellitic acid, a number average molecular mass of the amorphous copolyester is 2,500, a mass average molecular mass of the amorphous copolyester is 6,500, a softening point of the amorphous copolyester is 91° C., glass transition point of the amorphous copolyester is 51° C., an acid value of the amorphous copolyester is 15.5 mg KOH/g, the fine particles comprising the binder resin are fine particles prepared by microparticulation of the binder resin together with a polyoxyethylene alkylether sulfate, and the pigment fine particles have an average primary particle diameter of 50 nm or less, a Cv value of less than 20%, and an average circularity of from 0.94 to 0.97.

2. The toner for electrostatic latent image development according to claim 1, wherein the pigment fine particles are prepared by mixing a first pigment raw liquid and a second pigment raw liquid to thereby deposit a pigment, by use of a microreactor that is equipped with two circular disks of a fixed disk A and a rotatable disk B placed such that a thin layer is formed between circular surfaces of two disks;

a first raw liquid supply portion that supplies the first pigment raw liquid from a thin layer end to the thin layer; and at least one second raw liquid supply portion that is formed through an upper surface and a lower surface of the fixed disk, that is positioned opposite to the first raw liquid supply portion with respect to the center of the circular surface of the fixed disk, and that supplies the second pigment raw liquid from the upper side of the fixed disk.

3. The toner for electrostatic latent image development according to claim 2, wherein the thickness of the thin layer between the circular surfaces is from 1 μm to 100 μm.

4. The toner for electrostatic latent image development according to claim 2, wherein the first pigment raw liquids is water or an alkaline aqueous solution and the second pigment raw liquid is a pigment solution.

5. The toner for electrostatic latent image development according to claim 4, wherein the second raw liquid is an aqueous acidic solution of a pigment.

* * * * *